Patented Apr. 2, 1940

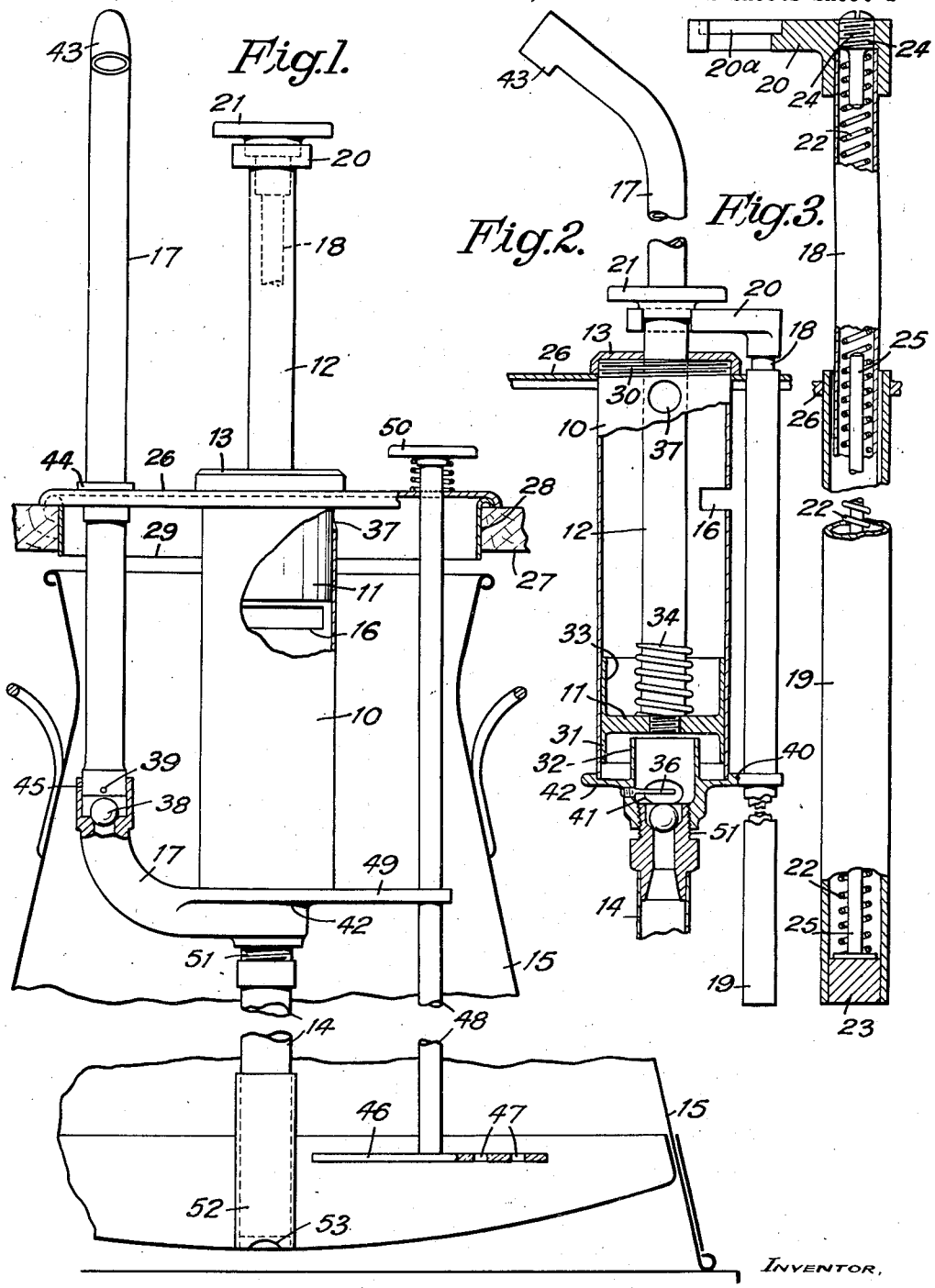

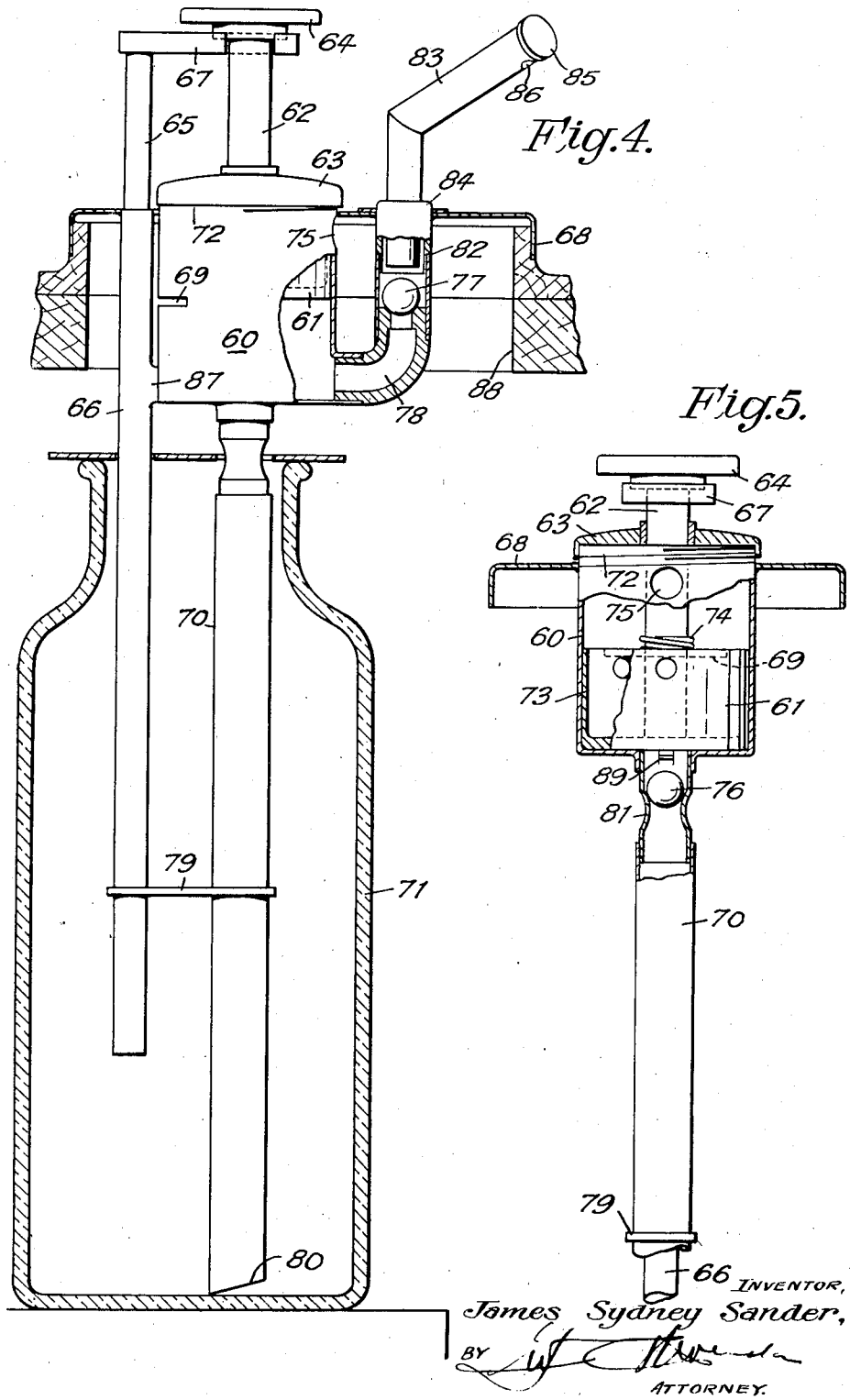

2,195,939

UNITED STATES PATENT OFFICE 2,195,939

LIQUID DISPENSING APPARATUS

James Sydney Sander, Twickenham, England

Application February 6, 1939, Serial No. 254,937
In Great Britain July 27, 1938

14 Claims. (Cl. 221—85)

This invention relates to apparatus for dispensing measured quantities of liquids.

The invention has for its main object to provide improved apparatus for dispensing relatively small quantities of liquids, for example milk drawn directly from a can for consumption in milk-bars and like establishments, and fruit juices drawn from jars or other containers for compounding various mixtures with milk or other liquids.

Another object of the invention is to provide improved apparatus for dispensing liquids in measured quantities with substantial accuracy by the use of a pump cylinder or barrel having its lower portion formed as a measuring chamber, the quantity of liquid dispensed at each delivery stroke of the pump piston being determined by a port provided in the side wall of the cylinder barrel.

Other objects of the invention are to provide improved dispensing apparatus adapted for operation by a single depression of a slidable knob for each delivery; to enable the accuracy of the measurement to be adjusted readily; to provide dispensing apparatus adapted for use with the regular containers in which the liquids are supplied; and to reduce risks of contamination of the liquids by the dispensing apparatus.

The invention is illustrated in two embodiments upon the accompanying drawings, to which reference is made hereafter and in which:

Fig. 1 is a part-sectional elevation showing the dispensing apparatus fitted to the counter of a milk-bar.

Fig. 2 is a sectional elevation of the pump cylinder, seen at right angles to Fig. 1, the piston being depressed.

Fig. 3 is a section of the control member on a larger scale.

Fig. 4 is an elevation of a second form of the invention.

Fig. 5 is a sectional elevation, seen at right angles to Fig. 4, the piston being depressed.

As shown in Figs. 1 to 3, the dispensing apparatus comprises a vertical pump cylinder or barrel 10 having a piston 11 mounted therein upon a slidable rod 12 extending through the top cover 13, with a valve-controlled supply or inlet tube 14 extending down from the closed lower end of the cylinder into the liquid contained in the vessel 15, a port 16 being provided in the side wall of the cylinder to limit the quantity of liquid drawn through the valve-controlled tube 14 by upward movement of the piston 11, and a valve-controlled discharge pipe 17 extending outwardly and upwardly from the lower end of the cylinder for delivery of the liquid by a subsequent downward movement of the piston, the quantity of liquid delivered at each downward movement being determined by the capacity of the lower portion of the cylinder barrel up to the level of the lower edge of the port 16.

The stroke of the pump piston is controlled by a tubular member 18 sliding vertically in a guide tube 19 at one side of the cylinder 10, the control member 18 carrying a fork or yoke 20 which engages with an operating knob or handle 21 at the top of the piston rod 12; this control member is normally lifted by a spring 22 so that it acts to return the pump piston 11 to the top of the cylinder after each delivery stroke, the downward movement being regulated by a stop device, adjustable to suit particular requirements. The fork 20 can be disengaged from the handle 21, to facilitate the cleaning of the pump, by first depressing the control member 18 and then turning it so as to move the fork aside from the piston rod and handle; accidental disengagement is prevented by fitting the boss of the handle 21 inside a stepped recess 20a within the fork.

As shown in Fig. 3, the control member consists of a tube 18 carrying the fork 20 and slidable inside a fixed tube 19 mounted beside the pump cylinder 10, the lower end of the fixed tube being closed by a plug 23 and the upper end of the inner slidable tube being fitted with a vertically adjustable screw 24; a long coiled spring 22 is enclosed in the two tubes, and a rod 25 of suitable length is mounted loosely inside the coiled spring 22. The lower end of this rod is fitted with a washer-plate 25a resting upon the plug 23 at the closed end of the fixed tube 19; the upper end of the rod, which is approximately level with the top of the cylinder 10, engages with the adjustable stop screw 24 when the control member formed by the slidable tube 18 is depressed to the full extent allowed by the adjustment of the screw, the piston 11 being then at the bottom of the cylinder. The maximum adjustment provided by the screw 24 may correspond for example to a variation of one quarter of a fluid ounce over or above a nominal measure of eight ounces, as suitable for compounding a milk "shake" containing eight ounces of milk and two ounces of fruit juice or the like.

It will be understood that the pump barrel 10 is designed to have a capacity below the port 16 corresponding to the particular output required, allowing only a slight adjustment at the screw to compensate for wear in the moving parts of the pump and control member.

The pump cylinder is shown mounted at the centre of a circular plate 26 which may be adapted to rest upon the rim of a milk can or other vessel, the cylinder being then within the can so that the valve-controlled inlet tube 14 extends down to the middle of the bottom of the milk can and the port 16 allows escape either of air or of milk back into the can. As shown in Fig. 1, however, the pump is fitted to the counter 27 of a milk bar, the counter being recessed at 28 to receive a flanged ring 29 upon which the circular plate 26 rests at its periphery with the inlet pipe 14 extending down into a milk can 15 set in position beneath the counter.

The cylinder 10 is shown with its upper end shouldered down and screwed at 30 for connection to a correspondingly screw threaded hole in the mounting plate 26, the joint being secured by soldering if desired; the projecting screw threads above the plate 26 serve for the attachment of a cylinder cover 13 through which the piston rod 12 slides. The piston 11, which has a plain external surface and is not provided with packing rings fitting in grooves wherein deposits might collect, is shown recessed on both faces, so as to provide a dependent skirt 31 which descends around an upstanding annular fence or flange 32 at the lower end of the cylinder 10, and also an inverted skirt 33 which abuts against the cylinder cover 13 at the top of the stroke, a buffer spring 34 being fitted around the piston rod 12 to cushion the shock; the fence 32 surmounts the non-return inlet valve which is shown as consisting of a ball 35, the lift of which is limited by a pin 36. Above the level of the port 16 a vent hole 37 is provided in the side wall of the cylinder 10 to allow escape of air after the piston has risen above the port 16, together with surplus milk collecting above the piston, such milk draining down the outside of the barrel and returning to the vessel 15.

The flange 32 is adapted to enter into the recessed underside of the piston 11 and within the dependent skirt 31 when the piston is at the bottom of its stroke, so that as the piston rises, the milk is drawn up by suction through the inlet pipe 14 and valve 35 until the bottom of the skirt 31 reaches the port 16, which may comprise one or more slots extending partly around the cylinder wall. During this operation, the inlet valve 35 opens but the non-return valve 38 in the discharge pipe 17 remains closed; this non-return valve, which is also shown as consisting of a ball, has its lift limited by a pin 39. The milk within the skirt 31 falls back to the level of the lower edge of the slot 16, the excess overflowing into the can 15 below, and the charge in the measuring chamber formed by the lower portion of the cylinder is thus always brought to exactly the same level. The overflow port 16 also acts as a safety device to avoid undue discharge through the delivery pipe 17 when the piston rebounds from the buffer spring 34 at the top of its stroke, the air below the piston being vented freely through this port, which thus ensures delivery of a constant amount at each operation of the piston.

The outer guide tube 19 of the control member is secured at its upper end to the mounting plate 26 and is also supported by a lug 40 projecting from the closed end of the pump cylinder 10, the lower end of the guide tube 19 extending down into the milk can 15 parallel to the inlet tube 14 but stopping short of the bottom of the can. The delivery pipe 17 extends from a hole 41 in the bottom 42 of the pump cylinder and up through the mounting plate 26, its upper end being curved over to provide a suitable spout 43, which can be adapted for turning in any direction by providing the pipe 17 with a collar 44 rotatable in the mounting plate 26 and a spigot and socket coupling 45 in the straight part of the pipe below the plate; the non-return valve 38 is shown fitted inside the coupling socket, so as to be accessible upon removal of the spout 43 and upper portion of the delivery pipe 17. An agitator of the known kind can also be provided, comprising a disc 46, which may be perforated as at 47, secured at the bottom of a slidable rod 48 extending down from the mounting plate 26 to another lug 49 projecting from the closed end of the pump cylinder, the upper end of the rod being fitted above the plate with a knob 50 bearing an inscription such as "Agitate often."

The inlet tube 14 is connected to the bottom 42 of the pump cylinder 10 by a suitable detachable coupling 51, so that it may be removed for access to the valve 35 at the bottom of the cylinder and also for cleaning. The lower end of the inlet tube is preferably made telescopic by the provision of a tightly sliding sleeve or extension 52, resting directly upon the bottom of the milk can, irrespective of any small variation of the height, the open end portion of the sleeve or extension 52 being made with scalloped edges 53 to allow entrance of milk into the tube 14 upon the suction stroke of the piston 11.

It will be noted that the piston 11 and valves 35, 38, constitute the only moving parts in contact with the milk, and that the joints to which the milk has access are arranged as far as possible to avoid the use of screw threads upon which deposits might collect, so that the risks of contamination are reduced.

An important feature of the present invention is the provision of the slot or port 16 in the wall of the cylinder at the top of the measuring chamber. This port fixes the top level of liquid in the measuring chamber and in cases where milk or other light and mobile liquids are to be dispensed serves as an overflow port for excess liquid, so that a constant volume is delivered through the valve-controlled discharge pipe 17 on the downward stroke of the piston.

Where liquids of a heavy or viscous nature are to be dispensed, such as fruit juice and the like, the port 16 is not required to serve as an overflow for excess liquid because the viscous liquid enters quite slowly, but the port is still employed as an air-vent to stop the suction on the inlet and to prevent liquid from being forced out from the discharge pipe when the piston rebounds on the buffer spring at the top of the stroke. Moreover, since greater suction is required in order to draw up the heavy or viscous liquid from the supply, I prefer to employ a piston having a flat or disc-like underside, so as to avoid all clearance space in which air may become trapped, with a resulting reduction of the suction produced when the piston rises.

A modified form of the invention, especially suitable for dispensing heavy and viscous liquids such as fruit juices and syrups, is illustrated upon Figs. 4 and 5 of the drawings, in which the apparatus comprises a vertical pump cylinder or barrel 60, having a piston 61 mounted therein upon a slidable rod 62 extending through the top cover 63 and adapted to be depressed by means of a knob or handle 64. The cylinder in this embodiment is of smaller height and capacity than that of the apparatus described with reference to Figs. 1 to 3, for the reason that the fruit juice is usually dispensed in smaller quantities than milk, for example, two ounces of fruit juice to eight ounces of milk, when compounding a milk "shake" as already mentioned.

The stroke of the pump piston is controlled by a member 65 sliding vertically under the action of a spring enclosed in a guide tube 66 at one side of the cylinder 60, the control member carrying a fork or yoke 67 which engages beneath the operating knob or handle at the top of the piston rod, as already described with reference to Figs. 1 to 3.

The pump cylinder 60 is vertically mounted at the center of an oval plate 68 adapted to rest upon a counter or other support, the cylinder being provided with a port 69 at about the middle of its height and with a valve-controlled inlet tube 70 extending down from the bottom of the cylinder into a jar or container 71 for the fruit juice or the like. The cylinder has its upper end shouldered down and screwed at 72 for connection to a correspondingly screw-threaded hole in the mounting plate 68, the joint being secured by soldering, and the projecting screw-threads above the plate serving for the attachment of the cylinder cover 63 through which the piston rod 62 slides.

The piston 61, which is not provided with grooves or packing rings, is provided with an inverted skirt 73 which abuts against the cylinder cover 63 at the top of the stroke, a buffer spring 74 being fitted around the piston rod to cushion the shock at this point; a hole 75 is provided in the side wall of the cylinder to allow escape of air from above the piston, this hole being above the level of the port in the cylinder wall.

The piston 61 is substantially flat on its underside and adapted to fit closely into contact with the bottom of the cylinder when the piston is at the bottom of its stroke; this arrangement facilitates the cleaning of the interior of the pump barrel. Moreover, it reduces the clearance to a minimum, so that as the piston rises, the liquid is drawn up by suction through the inlet tube 70 until the bottom of the piston uncovers the port 69, consisting for example of one or more slots around part of the wall of the cylinder, air then entering through the port 69 to break the suction, leaving the liquid level with the lower edge of the port. During this operation, the inlet valve 76 opens but the non-return valve 77 in the discharge pipe 78 remains closed. The port also acts as a safety device to avoid undesired discharge of liquid through the delivery pipe 78 when the piston rebounds at the top of its stroke, the air beneath the piston being vented through the port.

The port 69 thus acts to ensure a constant quantity of liquid being supplied at each upward stroke of the piston and also affords a vent for air beneath the piston when the latter reaches the top of its stroke.

The inlet tube 70 which supplies the cylinder barrel forming the measuring chamber, is connected to the bottom of the cylinder by brazing or welding thereto, and is also connected to the control member tube 66 by a link or strap 79 brazed or welded in position; the lower end of the inlet tube is shown bevelled at 80, so that it can rest directly upon the bottom of the jar or container 71, without obstructing the flow of liquid. The inlet tube 70 is shown fitted with a non-return valve in the form of a ball 76 seated on the upper side of a constriction 81 in the pipe, the upper end of the pipe being provided with a lip 89 which is turned in over the ball 76 to prevent the latter from being drawn up out of the pipe. The discharge pipe 78 which extends radially from the bottom of the cylinder 60 or from the top of the inlet pipe 70 (above the non-return valve therein) is formed with an upward bend leading to a spigot and socket connection 82 for the delivery spout 83, which is rotatably supported in the plate 68 by means of a collar 84.

The delivery spout has its upper portion inclined upwardly, the outer end being closed by a cap 85 and a hole 86 being provided on the underside of the spout adjacent to its closed end so that the liquid is delivered without drips. The spout can be turned in any desired direction, due to the rotatable bearing in the mounting plate 68 and to the spigot and socket coupling 82 in the vertical part of the pipe below the plate; the non-return valve 77, for example a ball of the same type as that provided in the inlet pipe, may be fitted inside the coupling socket, so as to be accessible upon removal of the spout or upper portion of the pipe.

The outer guide tube 66 of the control member is secured at its upper end to the aforesaid mounting plate 68 and is also supported by a lug 87 projecting from the closed end of the pump barrel or cylinder 60, the lower end of the guide tube extending down into the jar or container, parallel to the inlet tube 70.

Where the dispensing apparatus shown in Figs. 4 and 5 is to be fitted to the counter of a milk bar, for example in conjunction with the milk pump shown in Figs. 1 to 3, I may fit the mounting plate 68 over a suitable recess 88 in the counter, the inlet tube 70 and control member 65—66 extending down through the recess into the jar or container 71 supported below the counter; two or more small apparatus for dispensing fruit juices or the like may be associated with one or more larger apparatus for dispensing milk or other liquids. The invention is not limited to apparatus of the particular sizes for dispensing the quantities of liquids mentioned above; for example, the apparatus may dispense milk in the small quantities required for filling milk jugs to be served with pots of tea, coffee or the like.

The improved apparatus is preferably made of stainless steel or other metal unable to affect the liquid for which it is employed. It can be dismantled for cleaning in a few seconds and need have no screw threads in contact with the liquid, since the joint between the inlet tube and the cylinder may be made without screw threads, as shown in Fig. 5. The improved apparatus always dispenses an accurate measure of liquid which is gauged in the measuring chamber during the spring-controlled rise of the piston and ready to be discharged through the delivery spout upon the next depression of the piston by the operating knob or handle.

What I claim is:

1. Apparatus for dispensing measured quantities of liquid, comprising a pump barrel, said pump barrel having upper and lower ends with a lateral opening intermediate between said ends, a piston displaceable in said barrel, said piston normally occupying a position adjacent to said upper end, means for depressing said piston to said lower end, and valve-controlled supply and discharge pipes leading respectively to and from said lower end.

2. Liquid dispensing apparatus, comprising a pump cylinder having a substantially vertical wall, a piston reciprocable in said cylinder, said piston normally occupying a position adjacent to the upper end of said cylinder, means for depressing said piston to the lower end of said cylinder, said cylinder wall having a port at a level below the bottom edge of said piston in its normal position, and valve-controlled supply and discharge pipes leading respectively to and from said lower end.

3. Liquid dispensing apparatus, comprising a pump cylinder having a substantially vertical wall, a piston reciprocable in said cylinder, said piston normally occupying a position adjacent to the upper end of said cylinder, means for depressing said piston to the lower end of said cylinder, said cylinder wall having a port at a level below the bottom edge of said piston in its normal position, the lower end of said cylinder forming a measuring chamber of a capacity limited by the level of said port, and valve controlled supply and discharge pipes leading respectively to and from said lower end.

4. Liquid dispensing apparatus, comprising a pump cylinder having a substantially vertical wall, a piston reciprocable in said cylinder, said piston normally occupying a position adjacent to the upper end of said cylinder, means for depressing said piston to the lower end of said cylinder, said cylinder wall having a port at a level below the bottom edge of said piston in its normal position, said port acting as a vent to limit the quantity of liquid drawn into said cylinder by upward movement of said piston, and valve-controlled supply and discharge pipes leading respectively to and from said lower end.

5. Liquid dispensing apparatus, comprising a pump cylinder having a substantially vertical wall, a piston reciprocable in said cylinder, said piston normally occupying a position adjacent to the upper end of said cylinder, means for depressing said piston to the lower end of said cylinder, said cylinder wall having a port at a level below the bottom edge of said piston in its normal position, said cylinder having a vent hole adjacent to its upper end, said port acting as an overflow to limit the quantity of liquid drawn into said cylinder by upward movement of said piston and said vent hole acting to release air from above said piston, and valve-controlled supply and discharge pipes leading respectively to and from said lower end.

6. Liquid dispensing apparatus, comprising a pump cylinder having a substantially vertical wall, a piston reciprocable in said cylinder, said piston normally occupying a position adjacent to the upper end of said cylinder, means for depressing said piston to the lower end of said cylinder, said cylinder wall having a port at a level below the bottom edge of said piston in its normal position, said piston having a smooth cylindrical periphery with its underside shaped to conform closely to the adjacent surface of the lower end of said cylinder and with an inverted skirt upon its upper side, and valve-controlled supply and discharge pipes leading respectively to and from said lower end.

7. Liquid dispensing apparatus comprising a pump cylinder having a substantially vertical wall, a piston reciprocable in said cylinder, said piston normally occupying a position adjacent to the upper end of said cylinder, means for depressing said piston to the lower end of said cylinder, said cylinder wall having a port at a level below the bottom edge of said piston in its normal position, an upstanding annular flange upon the lower end of said cylinder, said piston having a smooth cylindrical periphery with a dependent skirt on its underside and an inverted skirt upon its upper side, said dependent skirt adapted to descend around said upstanding flange, said port acting as a vent to limit the quantity of liquid drawn into said cylinder by upward movement of said piston, and valve-controlled supply and discharge pipes leading respectively to and from said lower end.

8. Liquid dispensing apparatus, comprising a pump cylinder having a substantially vertical wall, a piston reciprocable in said cylinder, said piston normally occupying a position adjacent to the upper end of said cylinder, means for depressing said piston to the lower end of said cylinder, said cylinder wall having a port at a level below the bottom edge of said piston in its normal position, said piston having a smooth cylindrical periphery and a flat underside, and valve-controlled supply and discharge pipes leading respectively to and from said lower end, said port acting to limit the quantity of liquid drawn into said cylinder through said supply pipe by upward movement of said piston.

9. Liquid dispensing apparatus comprising a pump cylinder, said pump cylinder having upper and lower ends with a lateral opening intermediate between said ends, a piston displaceable in said cylinder, a spring control tending to displace said piston towards the upper end of said cylinder, manual means for displacing said piston towards the lower end of said cylinder, and valve-controlled supply and discharge pipes leading respectively to and from the lower end of said cylinder, said lower end forming a measuring chamber of a capacity limited by the level of said opening and being automatically refilled by the spring-operated return of said piston after discharge of a measured quantity by manual displacement of said piston.

10. Liquid dispensing apparatus comprising a pump cylinder, said pump cylinder having upper and lower ends with a lateral opening intermediate between said ends, a piston displaceable in said cylinder, a spring control tending to displace said piston towards the upper end of said cylinder, manual means for displacing said piston towards the lower end of said cylinder, a buffer spring for cushioning the spring-operated return of said piston, said opening acting as an air vent to prevent accidental discharge of liquid when said piston rebounds on said buffer spring, and valve-controlled supply and discharge pipes leading respectively to and from the lower end of said cylinder.

11. Liquid dispensing apparatus comprising a pump cylinder, said pump cylinder having upper and lower ends with a lateral opening intermediate between said ends, a piston displaceable in said cylinder, a spring control tending to displace said piston towards the upper end of said cylinder, manual means for displacing said piston towards the lower end of said cylinder, a buffer spring for cushioning the spring-operated return of said piston, said opening acting as an air vent to prevent accidental discharge of liquid when said piston rebounds on said buffer spring, and valve-controlled supply and discharge pipes leading respectively to and from the lower end of said cylinder, said lower end forming a measuring chamber of a capacity limited by the level of said opening.

12. Liquid dispensing apparatus comprising a vertical cylinder, a piston displaceable in said cylinder, a control member for raising said piston, manual means for lowering said piston, valve-controlled supply and discharge pipes leading respectively to and from the bottom of said cylinder, the wall of said cylinder having a slot opening at a level below the bottom edge of said piston when at the top of its movement, said control member and supply pipe extending parallel to the axis of said cylinder, a mounting plate adapted to support said cylinder above a container with said supply pipe extending down into liquid in said container, said discharge pipe extending up through said mounting plate, and a spout connected to said discharge pipe above said mounting plate.

13. Liquid dispensing apparatus comprising a vertical cylinder, a piston displaceable in said cylinder, a control member for raising said piston, manual means for lowering said piston, valve-controlled supply and discharge pipes leading respectively to and from the bottom of said cylinder, the wall of said cylinder having a slot opening at a level below the bottom edge of said piston when at the top of its movement, said control member and supply pipe extending parallel to the axis of said cylinder, a mounting plate adapted to support said cylinder above a container with said supply pipe extending down into liquid in said container, said discharge pipe extending up through said mounting plate, and a spout connected to said discharge pipe above said mounting plate, said spout being rotatable in relation to said discharge pipe.

14. Liquid dispensing apparatus comprising a vertical cylinder, a piston displaceable in said cylinder, a control member for raising said piston, manual means for lowering said piston, valve-controlled supply and discharge pipes leading respectively to and from the bottom of said cylinder, the wall of said cylinder having a slot opening at a level below the bottom edge of said piston when at the top of its movement, an agitator rod, said agitator rod, control member and supply pipe extending parallel to the axis of said cylinder, a mounting plate adapted to support said cylinder above a container with said supply pipe and agitator rod extending down into liquid in said container, said discharge pipe extending up through said mounting plate, and a spout connected to said discharge pipe above said mounting plate.

JAMES SYDNEY SANDER.